United States Patent [19]

Bornfleth

[11] 4,105,258

[45] Aug. 8, 1978

[54] SERVO TYPE SWITCHING FOR REMOTE AUTOMATIC BRAKING SYSTEM

[75] Inventor: Jay W. Bornfleth, Ridgecrest, Calif.

[73] Assignee: The United States of America as represented by the Secretary of the Navy, Washington, D.C.

[21] Appl. No.: 798,413

[22] Filed: May 19, 1977

[51] Int. Cl.² .................................................. B60T 8/12
[52] U.S. Cl. ........................................ 303/93; 244/111
[58] Field of Search ...................... 180/82 R; 192/.094; 244/111; 303/20, 91–112; 188/181 A

[56] References Cited

U.S. PATENT DOCUMENTS

| | | | |
|---|---|---|---|
| 3,426,872 | 2/1969 | Irie et al. | 192/.094 |
| 3,537,758 | 11/1970 | Buhler et al. | 303/105 X |
| 3,593,815 | 7/1971 | Inoue | 180/82 R |
| 3,829,167 | 8/1974 | Rouf et al. | 303/93 |
| 3,838,890 | 10/1974 | Wind | 303/107 |
| 3,850,480 | 11/1974 | Atkins | 303/97 |
| 3,920,204 | 11/1975 | Bissell | 244/111 |
| 3,920,278 | 11/1975 | Hirzel et al. | 303/93 |
| 3,930,688 | 1/1976 | Rau et al. | 303/106 |
| 3,953,080 | 4/1976 | Bremer | 303/107 |
| 4,007,970 | 2/1977 | Romero | 303/20 X |

Primary Examiner—Stephen G. Kunin
Attorney, Agent, or Firm—R. S. Sciascia; Roy Miller; Kenneth Pritchard

[57] ABSTRACT

A remote autobrake system. A linear accelerometer measures the acceleration of a vehicle to determine if it is having thrust applied to it. If the engine of the vehicle is applying thrust, a servo switch is used to prevent engagement of the brakes. This systems acts as a constant deceleration system if the thrust is below a predetermined level. This system can be used with an antiskid brake system.

1 Claim, 2 Drawing Figures

SERVO TYPE SWITCHING FOR REMOTE AUTOMATIC BRAKING SYSTEM

BACKGROUND OF THE INVENTION

1. Field of the Invention

This invention relates to the Field of Aeronautical Engineering. In greater particularity, the invention relates to small aircraft landing systems. In greater particularity, this invention relates to drone aircraft automatic braking systems. The type of automatic braking system described in this invention is more accurately described as an aircraft landing deceleration system.

2. Description of the Prior Art

Automatic braking systems used in drone aircraft have carrier type landing equipment where a tail hook is used to catch an arresting cable to halt the aircraft. Since not all vehicles can be efficiently or practically stopped in this manner, a more appropriate braking system has long been desired. This system was the deceleration system. It applies a constant deceleration to the vehicle. The remote automatic braking system which is also referred to as a deceleration control system is shown in FIG. 1 and shows a typical prior act system. The advantages of such a system are that once the initial speed is determined the stopping distance becomes a fixed characteristic of the braking system and that the amount of force applied no longer has to be the full possible braking force of conventional braking systems. This lowers the possibility that a skid from wheel lock could occur. It is noted that well known anti-skid devices have been developed to avoid these skids. They are produced by full force braking systems and are distinct from a deceleration control system. Such anti-skid devices could be used in addition to the deceleration system described herein.

After the deceleration control systems became popular and experience with such systems was obtained, a serious drawback became apparent. This drawback is that the force is applied immediately through remote control switching while the thrust controls usually have a time lag. If the thrust is continuing when the deceleration force is applied the tires will be overloaded with catastrophic results.

SUMMARY OF THE INVENTION

A deceleration system which avoids overloading on tires is produced by having a level detector monitor the actual acceleration of the vehicle. By providing an error signal for positive acceleration beyond a set limit, the automatic braking command is overridden. Once the vehicle reaches either no acceleration or only a trivial level beneath the overloading point the automatic brakes will be applied.

An objective of the present invention is to provide a servo switch mechanism which will prevent overloading of automatic braking systems when engine thrust is still applied and accelerating the aircraft.

DESCRIPTION OF THE PREFERRED EMBODIMENT

Figure 1:
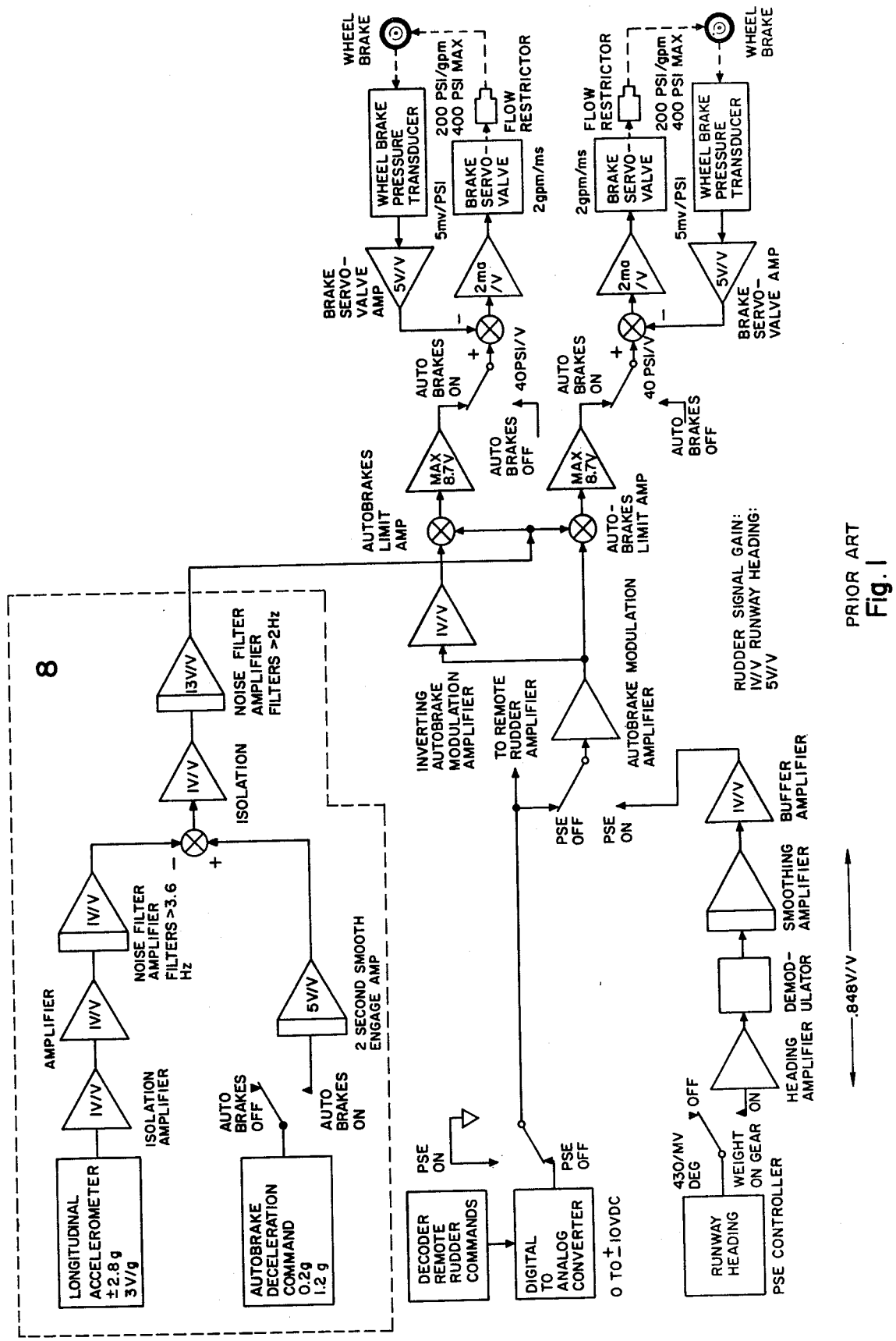
FIG. 1 is a block diagram of a remote automatic brake system.
Figure 2:
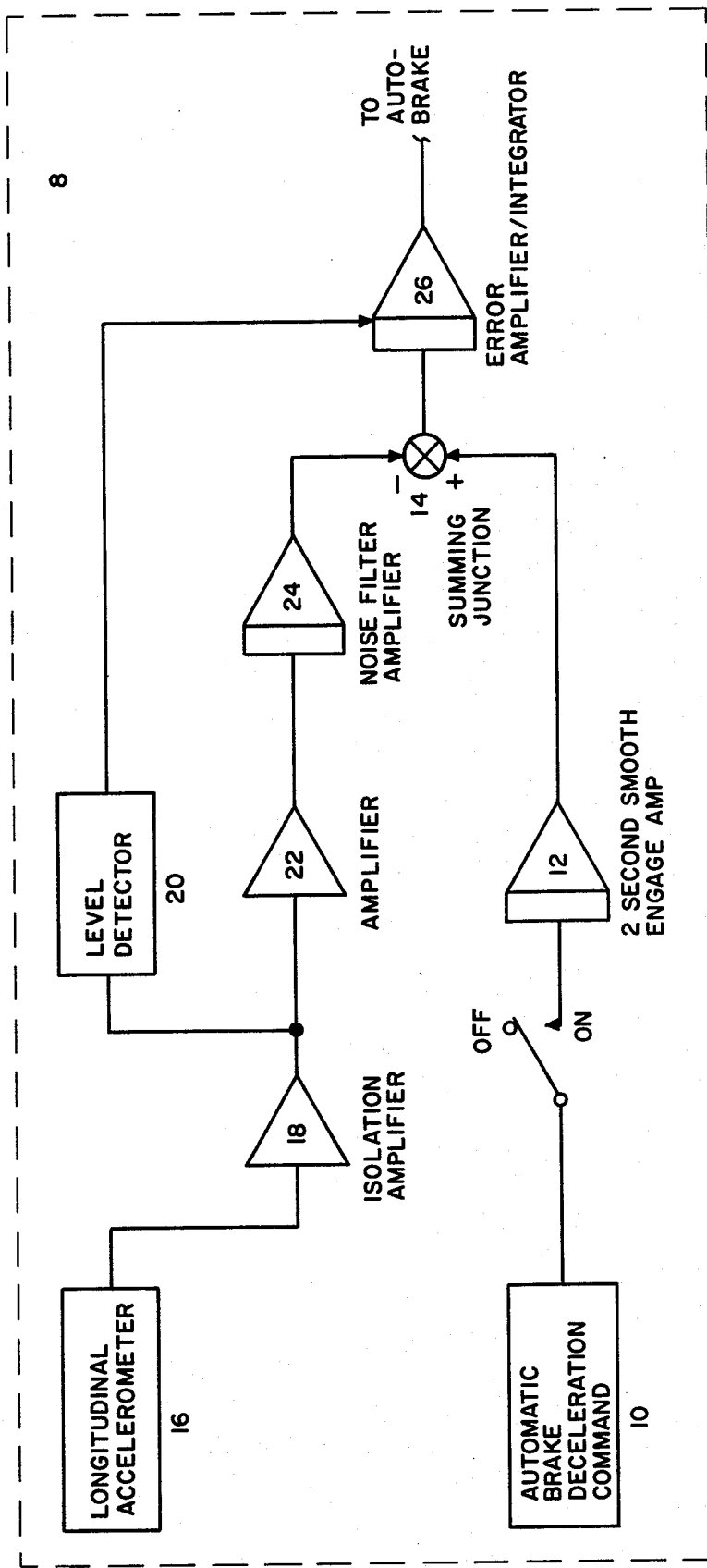
FIG. 2 is a schematic of the servo switch braking circuit of the invention.

The overall automatic brake system is shown in FIG. 1. The section referred to generally by numeral 8 is the section of the system to be replaced by FIG. 2. The circuit shown in FIG. 2 is initially triggered by the receipt of a signal in deceleration command 10. For the system shown, the description will assume it is contained in a drone aircraft. However, this system will work equally well on other vehicles manned or otherwise.

The triggering pulse from command 10 then encounters amplifier 12. The purpose of amplifier 12 is to provide a short delay in the rise time of the triggering signal. It is referred to as a time delay smooth engage amplifier. Summing junction 14 could be damaged by a full pulse signal reaching it from the deceleration command 10. With a two second rise time the aircraft brakes are applied smoothly.

Summing junction 14 compares the command signal with the aircrafts longitudinal acceleration determined by longitudinal accelerometer 16. Summing junction 14 will usually not be a distinct component as shown in FIG 2. It is usually made part of the input to amplifier-/integrator 26. The accelerometer measures the acceleration state of the vehicle. This is converted to an analog electrical signal which is fed through isolation amplifier 18. Isolation amplifier 18 prevents loading of the accelerometer output. The output of isolation amplifier 18 is then sampled by level detector 20. If level detector 20 receives a signal corresponding to an acceleration rate greater than a predetermined acceleration rate, it puts out a signal that could be characterized as a 1 which provides an override signal to prevent the brakes from being applied. If level detector 20 receives the signal equivalent to an acceleration rate below that of the predetermined level, it provides an alternative signal or a 0 which does not block the output signal to the brakes. The output from isolation amplifier 18 also goes to amplifier 22 which is designed to boost the signal to a predetermined strength level. This boosted signal is then put through noise filter amplifier 24 which removes any extraneous frequencies which may have been picked up in the longitudinal accelerometer 16. Finally, the signal from noise filter amplifier 24 is fed into one side of the summing junction 14 and compared with the signal from the automatic brake deceleration command 10. The output from summing junction 14 is fed to error amplifier integrator 26 whose output is proportional to brake pressure. Error amplifier/integrator 26 serves to provide a fixed level of deceleration by matching the accelerometer 16 measurement level with the command 10 signal for the preset deceleration rate.

A drone system using the following values has been found to work experimentally. The automatic brake deceleration command 10 is set for a rate of 0.2g and is applied through the smooth engage amplifier 12. The accelerometer 16 then measures the aircraft deceleration in response to the deceleration command 10. If the output of the longitudinal accelerometer 16 is greater than 0.0522g in the forward direction, a reference signal is created which represents that the aircraft is accelerating due to high engine thrust. The level detector 20 causes a switch to be closed, a 1 condition, and the error amplifier/integrator 26 becomes set as a low fixed gain amplifier. This system is a low gain type 0 system with large steady state error. A type 0 system is well known in the art to be one whose output is fed to an amplifier. This system in effect generates a brake force proportional to engine thrust to reduce the aircraft acceleration when the maximum brake force available is insufficient to meet the deceleration command. If the output of the longitudinal accelerometer 16 is less than 0.0522g the switch is open, 0 condition, and the error amplifier integrates. This 0 condition produces a type 1 system. A type 1 system is one whose output is fed to an integrator. The integrated output produces a 0 steady state error from the summation junction. The integrated error is applied via the automatic brake amplifiers to the brake servo control system. The command brake pressure is sufficient to maintain a deceleration of 0.2 g. In operation the longitudinal accelerometer 16 measures this deceleration and applies it to the summation junction 14 to cancel out the deceleration command.

What is claimed is:

1. A remote automatic braking system for an aircraft vehicle with servo switching means attached to automatic brakes subject to system override if said vehicle is having thrust applied which comprises:
   a command system for engaging said automatic brakes by an initial signal which serves as a triggering impulse;
   a transition amplifier providing smooth engagement of said triggering from the command system, said transition amplifier positioned to receive said triggering impulse;
   an error amplifier/integrator containing a summing junction input which has an output of said transition amplifier as an input;
   a longitudinal accelerometer for establishing a reference signal representative of the acceleration state of said vehicle, said longitudinal accelerometer reference signal is an input to said error amplifier/integrator which is compared to said initial signal;
   an isolation amplifier electrically connected between said accelerometer and said error amplifier/integrator for preventing loading of said accelerometer by feedback;
   a level detector connected between said isolation amplifier and said error amplifier/integrator which is set to a predetermined level of acceleration due to thrust being applied and triggered by an output signal from said isolation amplifier which is greater than said predetermined level so that when said signal is greater than said predetermined level said level detector inputs a signal to said error amplifier/integrator to not engage said automatic brakes if said triggering impulse from said command system is received;
   an amplifier connected in parallel with said level detector between said isolation amplifier and said error amplifier/integrator for boosting said isolation amplifier output signal to a predetermined level suitable for inputting to said summing juntion in said error amplifier/integrator; and
   a noise filter for eliminating extraneous signals from said accelerometer prior to entry of said accelerometer amplified output signal into said summing junction of said error amplifier/integrator whose function is determined by said level detector so that for a given condition in said level detector said error amplifier/integrator amplifies or integrates.

* * * * *